US00RE40904E

(19) United States
(12) Reissued Patent
Garde

(10) Patent Number: US RE40,904 E
(45) Date of Reissued Patent: Sep. 1, 2009

(54) APPARATUS FOR GENERATING TARGET ADDRESSES WITHIN A CIRCULAR BUFFER INCLUDING A REGISTER FOR STORING POSITION AND SIZE OF THE CIRCULAR BUFFER

(75) Inventor: Douglas Garde, Dover, MA (US)

(73) Assignee: Analog Devices, Inc., Norwood, MA (US)

(21) Appl. No.: 10/412,827

(22) Filed: Apr. 14, 2003

Related U.S. Patent Documents

Reissue of:
(64) Patent No.: 5,623,621
Issued: Apr. 22, 1997
Appl. No.: 08/115,915
Filed: Sep. 1, 1993

U.S. Applications:
(63) Continuation of application No. 07/608,365, filed on Nov. 2, 1990, now abandoned.

(51) Int. Cl.
*G06F 12/00* (2006.01)

(52) U.S. Cl. ..... 711/110; 711/217; 711/218; 711/219; 711/220

(58) Field of Classification Search ..... 711/110, 711/217, 218, 219, 220
See application file for complete search history.

(56) References Cited

U.S. PATENT DOCUMENTS 3,461,433 A * 8/1969 Emerson ..... 711/220
3,813,652 A * 5/1974 Elmer et al. ..... 711/209
3,931,611 A * 1/1976 Grant et al. ..... 714/45
3,999,052 A * 12/1976 Gooding et al. ..... 711/154
4,169,289 A * 9/1979 Shively ..... 710/56
4,187,549 A * 2/1980 Bond et al. ..... 708/491
4,202,035 A * 5/1980 Lane ..... 711/217
4,251,860 A * 2/1981 Mitchell et al. ..... 711/220
4,408,274 A * 10/1983 Wheatley et al. ..... 711/163
4,432,054 A * 2/1984 Okada et al. ..... 713/601
4,453,209 A * 6/1984 Meltzer ..... 710/29
4,453,212 A * 6/1984 Gaither et al. ..... 711/2
4,485,435 A * 11/1984 Sibley ..... 711/211
4,623,997 A * 11/1986 Tulpule ..... 711/141
4,627,017 A * 12/1986 Blount et al. ..... 711/212
4,722,067 A * 1/1988 Williams ..... 708/491
4,724,479 A * 2/1988 Schmalfuss et al. ..... 348/83
4,800,524 A * 1/1989 Roesgen ..... 711/217
4,809,156 A * 2/1989 Taber ..... 711/217
4,819,165 A * 4/1989 Lenoski ..... 711/220
4,833,602 A * 5/1989 Levy et al. ..... 711/217
4,908,748 A * 3/1990 Pathak et al. ..... 711/220
4,935,867 A * 6/1990 Wang et al. ..... 711/217

FOREIGN PATENT DOCUMENTS

JP 61-289440 * 12/1986
WO WO 79/00035 * 2/1979

OTHER PUBLICATIONS

TMS320C30 Data Book, pp. 6–5, 6–6, and 6–22 through 6–25, Aug. 1988.*
English translation of Japanes patent application No. Sho 61[1986]–289440.*

* cited by examiner

*Primary Examiner*—Hiep T. Nguyen
(74) *Attorney, Agent, or Firm*—Wilmer Cutler Pickering Hale & Dorr LLP.

(57) ABSTRACT

The invention comprises a hardware constructed address generator for a circular buffer which can be of any size and be in any position in memory. The address generator calculates both an absolute value and a wrapped value and selects one in accordance with whether the wrapped value falls within the boundaries of the buffer.

14 Claims, 5 Drawing Sheets

APPARATUS FOR GENERATING TARGET ADDRESSES WITHIN A CIRCULAR BUFFER INCLUDING A REGISTER FOR STORING POSITION AND SIZE OF THE CIRCULAR BUFFER

Matter enclosed in heavy brackets [ ] appears in the original patent but forms no part of this reissue specification; matter printed in italics indicates the additions made by reissue.

This application is a continuation of application Ser. No. 07/368,365, filed Nov. 2, 1990, now abandoned.

FIELD OF THE INVENTION

The invention relates to the field of digital buffers and, more particularly, to the generation of addresses for accessing digital buffers. Even more particularly, the invention relates to the generation of addresses for accessing circular buffers.

BACKGROUND OF THE INVENTION

Digital information processors frequently employ digital memory buffers to temporarily store information en route to another device such as an input/output device or processor. A buffer may be constructed of dedicated hardware registers wired together or it may simply be a dedicated section of a larger memory. Such digital information buffers can take many forms. One such form is known as a circular buffer. In circular buffers, the addresses for accessing locations in the buffers typically are generated by modifying the contents of a pointer register which is external to the buffer area which points to an address location within the buffer. When that address is needed on the address bus, it is output from the pointer address and the pointer is incremented (or decremented) by a predetermined amount so as to be ready for the next instruction cycle which accesses the circular buffer. In circular buffers, means must be provided for "wrapping" the address around when the increment (or decrement) causes the address in the pointer register to fall without the bounds of the buffer. In other words, means must be provided for causing the address generator for the buffer to generate modulo addresses with the modulus being the length of the buffer.

In circular buffers, software techniques are generally used for the modulo address generation. These software address mapping techniques, however, require several instruction cycles to perform the necessary address comparisons, arithmetic operations and replacement of the pointer register contents. Such software address mapping is not fast enough for certain types of uses. Applications such as digital filters, Fast Fourier transforms, matrix manipulations and other common digital signal processing routines require a very rapid generation of memory references. Accordingly, software modulo address generation can significantly decrease the speed of fast signal processing apparatus. Accordingly, addressing schemes implemented in hardware are sometimes desirable.

One such hardware implemented system is disclosed in U.S. Pat. No. 4,800,524. The apparatus described in U.S. Pat. No. 4,800,524 comprises three registers external to the buffer, including (1) an L register which contains the length of the buffer, (2) an A register which contains the last address accessed in the buffer (this is the pointer register) and (3) an M buffer which contains an increment (or decrement) value to be added (or subtracted) from the A register. The apparatus also comprises two separate adder/subtractors, the first of which generates an absolute buffer address which is simply the contents of the A register added to the contents of the M register and a second adder/subtractor which generates a wrapped address by either adding (if M is positive) or subtracting (if M is negative) from the absolute address generated by the first adder the length of the buffer. Additional logic selects either the absolute address or the wrapped address responsive to the carry bits from the first and second adders. If the carry bits indicate that the absolute address generated is outside the boundaries of the buffer, the wrapped address is used and placed in the A register ready for the next access. Otherwise, the absolute address is selected and placed in the A register. The invention disclosed in the U.S. Pat. No. 4,800,524 patent is limited, however, in that in order for the system of examining the carry bits to work, the lower K bits of the buffer's base address (lowest address) must be zero, where K is the number of bits required to represent the length of the buffer and the length of the buffer must be a power of two. These limitations can be extremely inconvenient in certain applications.

It is one object of the present invention to provide an improved address generator for a circular buffer.

It is a further object of the present invention to provide an address generator for a circular buffer which places no restrictions on the size or the position in memory of the circular buffer.

It is another object of the present invention is to provide an address generator for a circular buffer which is substantially faster than software address generators.

SUMMARY OF THE INVENTION

The address generator of the present invention comprises four registers. In one preferred embodiment, the registers are as follows:

1) Base register, B, containing the lowest numbered address in the buffer,
2) an Index pointer register, I, containing the next address to be accessed in the buffer,
3) a Modify register, M, which is loaded with the increment (or decrement) value, and
4) a Length register, L, containing the length of the buffer.

In alternate embodiments, the Base or Length registers, but not both, can be replaced by an End register, E, which contains the highest address in the buffer.

In the preferred embodiment, when the circuit buffer is accessed by an instruction, the contents of the Index register are placed on the address bus and then the Index register is modified so as to be ready for the next access. When the modify value, M, is positive, adder/subtracters calculate the value of I+M (the absolute address) as well as I+M−L, (the wrap address). The output of the adder/subtractor which calculates I+M−L is compared to the output of register B. The output of the adder/subtractor which calculates I+M and the output of the adder/subtracter which calculates I+M−L are also placed as first and second inputs to a multiplexer. The output of the multiplexer is coupled to the input of the I register so as to select one of those two values as the new index value. If I+M−L is greater than or equal to B, the comparator controls the multiplexer to select the I+M−L input as the value to be loaded into the index register. Otherwise, the comparator controls the multiplexer to select the I+M input.

Alternate embodiments are possible where either the Length register or the Base register is replaced by an End register which contains the end value (i.e., the highest numbered address) of the buffer. Slight modification to the adder/subtracter circuitry would be necessary. In addition, any of these embodiments can be further modified for a system in which the modifier M is a negative value or where M may be positive or negative.

DETAILED DESCRIPTION OF THE INVENTION

Figure 1:
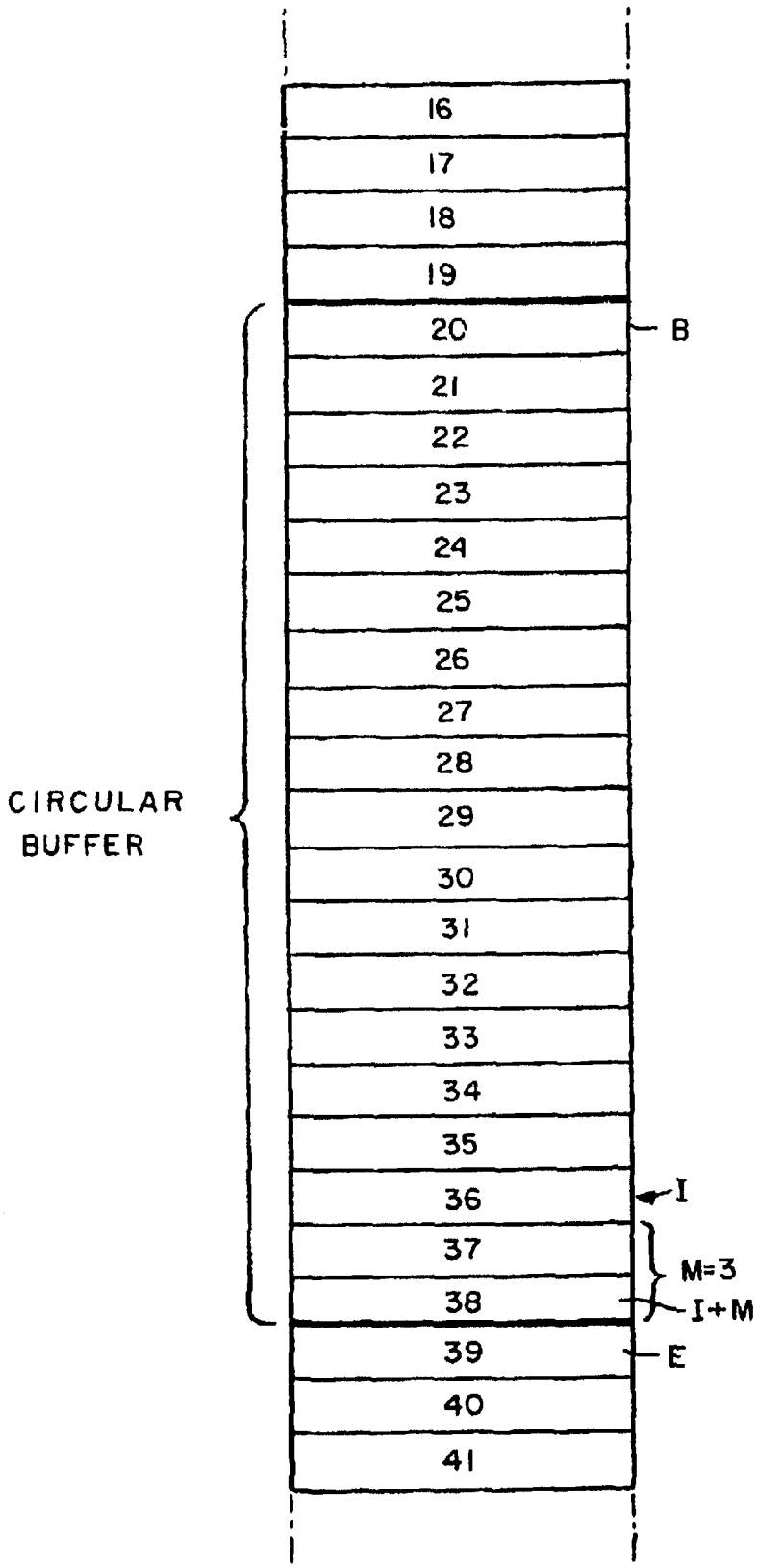
FIG. 1 shows an, exemplary circular buffer.

FIG. 1 illustrates a typical circular buffer incorporated as part of a larger memory. The base address of the buffer is the lowest numbered address in the buffer. In the example in FIG. 1 this is address 20, represented as B in FIG. 1. The highest address in the buffer is designated as the end address which in FIG. 1 is address 39 and is indicated as E. A pointer into the buffer typically comprises a register containing the address of the next location in the buffer to be accessed. This register will hereinafter be termed the index register, I. Typically in a circular buffer, after each access, the index pointer is incremented or decremented a predetermined number of addresses so as to be prepared for the next access into the circular buffer. The number of address spaces which the index pointer is incremented or decremented will hereinafter be referred to as the modify amount and is represented in FIG. 1 as M. It is common for the modify amount to be a fixed number which never changes. However, there are applications in which the modifier amount, M, may be varied.

As stated above, in a circular buffer, means must be provided for wrapping the index pointer around when the increment amount would cause the index pointer to exceed the bounds of the buffer. For instance, in FIG. 1, the index pointer is shown as pointing at address 35. If the increment amount M, is 3, then the pointer will be updated to point to address number 38. However, on the next increment of 3, the index pointer would normally point to address 41 which is beyond the bounds of the buffer. Accordingly, means must be provided for ensuring that when the increment of the index pointer causes it to exceed the end address of the buffer, it is wrapped around to the base of the buffer. For instance, on the next increment of the index pointer, the index pointer should point to address 21 rather than address 41.

Figure 2:
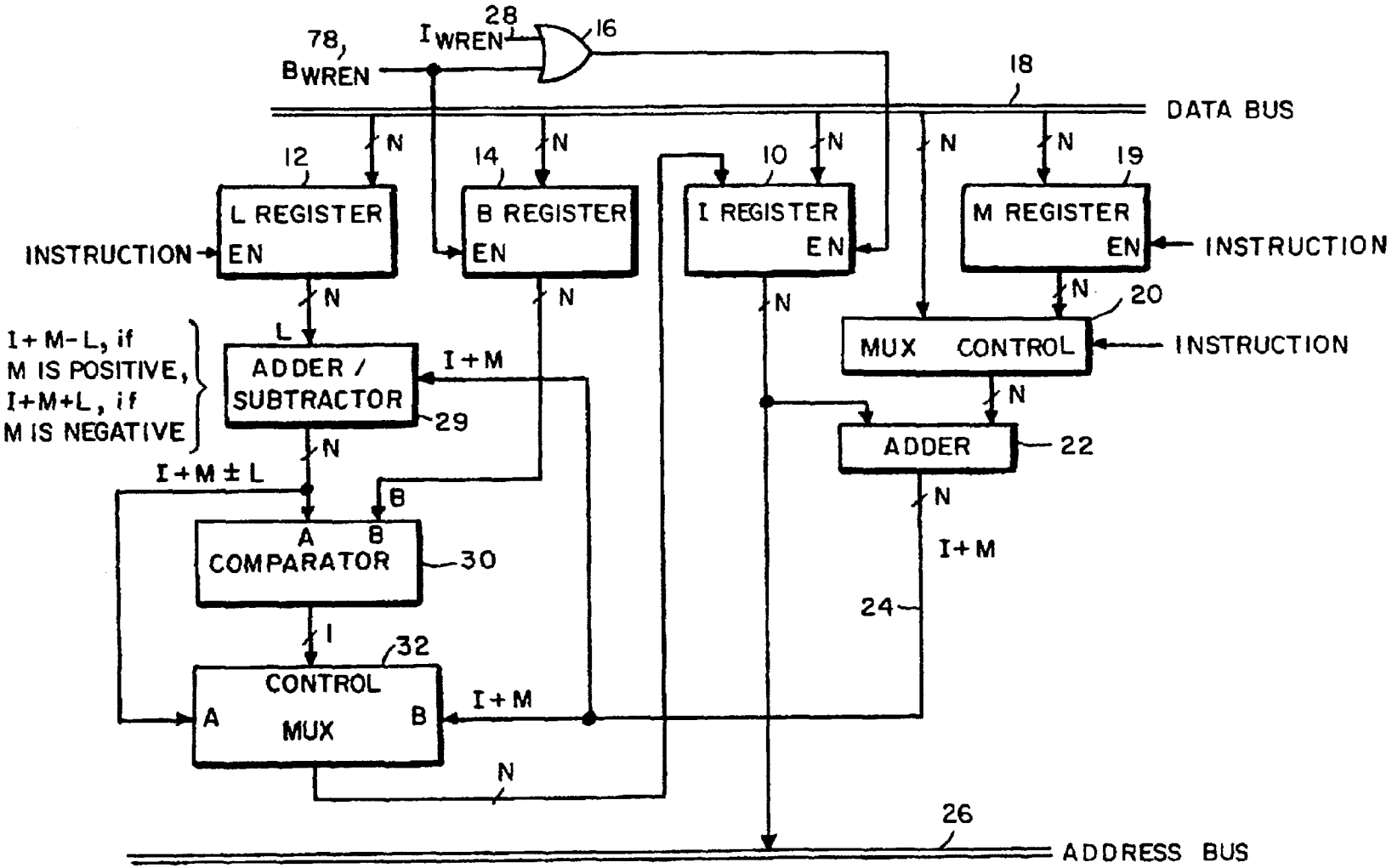
FIG. 2 shows a first embodiment of the address generator of the present invention.

FIG. 2 shows an address generator according to the present invention for generating addresses for a circular buffer such as the buffer shown in FIG. 1. FIG. 2 shows an embodiment of the invention in which the increment, M, is always positive or always negative, as is typical. However, other embodiments in which the modifier can be positive or negative are possible and are described later herein. The address generator of the preferred embodiment of the present invention comprises four registers, termed L, M, I and B. The L register 12 is initialized by loading it with the length of the circular buffer. The M register 19 is loaded with a increment (or decrement) value. The B register 14 is loaded with the base address of the circular buffer, i.e., the lowest numbered address if M is positive, or the highest numbered address if M is negative. The I register, which essentially comprises the pointer into the circular buffer, is automatically loaded with the base address when the base address is loaded into the B register. As shown in FIG. 2, OR-gate 16 assures that when a B register write enable instruction (B WREN 78) is issued, the I register is also write enabled such that both the B and the I registers receive the base address being placed on the data bus 18.

In most circular buffer applications, the buffer pointer, i.e., the I register, is incremented the same amount every time. Accordingly, a number can be permanently stored in the M register 19. In situations where the increment, M, may vary, a multiplexer 20 is provided. Under the control of a processor (not shown), to avoid unnecessary obfuscation, multiplexer 20 can select as the increment either the data placed on the data bus by the processor or the output of the M register 19.

The contents of the I register 16 are placed onto the address bus 26 in response to a processor instruction such as the $I_{WREN}$ signal 28 in FIG. 2. The logic in the address generator of the present invention will then modify the contents of the I register so that it will be ready for the next access into the circular buffer. Accordingly, an instruction cycle instructing the I register to output its contents onto the address bus initiates the sequence to be described herein for modifying the contents of the I register.

As the contents of the I register are output onto the data bus, they are also fed into one input of an adder 22. The other input of the adder is coupled to the output of the multiplexer 20 which contains the selected increment, M0 The value I+M is output from the adder 22 and fed to one input of adder/subtractor 27. At its other input, adder/subtractor 27 accepts the output of the L register which contains the length of the buffer. In the case where M is always positive, the adder/subtractor is set up to subtract L from I+M. However, if M is negative, then the adder/subtractor is set up to add the value of L to I+M.

If M is positive, then the value of I+M−L is compared with the base address, B, of the circular buffer by comparator 30, as shown in FIG. 2. The output of comparator 30 is the control signal to multiplexer 32. Multiplexer 32 receives at input A the value of I+M−L output from adder/subtractor 27 and at input B the value of I+M output from adder 22. The comparator determines if I+M−L is greater than or equal to B. If so, the comparator 30 outputs a signal which instructs the multiplexer to place at its output the value at its A input, I+M−L. Otherwise, the comparator instructs the multiplexer 32 to place at its output, the value at its B input, I+M. The output of the multiplexer is fed back to the input of the I register and represents the new pointer address which will be stored in the I register.

The purpose of the above-described operation of adder 22, adder/subtractor 27, comparator 30 and multiplexer 32 is explained as follows. The value of I+M output from adder 22 represents the new absolute value of the pointer (i.e., the old pointer value plus the increment M, regardless of whether it is within the bounds of the buffer). If the absolute value is within the range of the buffer, then no "wrapping around" is necessary and it can be placed directly into the I register. However, if it is beyond the range of the buffer, then the length of the buffer, L, must be subtracted from the absolute value in order to "wrap around" the address to modulo style. Adder/subtractor 27 calculates I+M−L whether it will be needed or not. Obviously, if I+M is within the buffer range, then subtracting the length, L, of the buffer from the absolute address will cause the address to be less than the base address of the buffer, thus indicating that "wrapping" is unnecessary. However, if I+M is beyond the bounds of the buffer, then I+M−L will be greater than or equal to the base address, B, of the buffer. Accordingly, comparator 30 determines if I+M−L is greater than or equal to the base address, B. If so, then I+M must have been beyond the range of the buffer and the comparator causes multiplexer 32 to place in the I register the value of I+M−L, rather than the value of I+M.

If M is negative, the operation is slightly modified. In this situation, the adder/subtractor 27 calculates the value of I+M (M being negative)+L instead of I+M−L, and the B register contains the highest numbered, rather than lowest numbered, address in the buffer. Accordingly, the comparator operation also must be modified so that, if the value as its A input, I+M+L, is less than or equal to the value at its B input, the highest address in the buffer, B, then it instructs the multiplexer 30 to select I+M+L. Otherwise it selects its other input, I+M.

As described above, depending on the sign of M, the adder/subtractor 27 and the comparator 30 perform slightly different operations. However, from a manufacturing standpoint, it is desirable to produce a single address generator which can be used in applications where M is positive or negative, rather than producing a separate device for each situation. Accordingly, in the preferred embodiment, adder/subtractor 27 and comparator 30 are designed to perform the separate above-described functions responsive to the sign bit of the contents of the M register. Accordingly, not only is the address generator capable of handling both of these situations (where M is positive or where M is negative), but, with a small amount of additional circuitry, it will also function properly where the sign of M can change during operation as discussed below.

Although the description of the invention above has been limited to situations where M is either known to be positive or negative, there are applications where the offset, M, can change from positive to negative during operation. For example, in the fast generation of phase values in high speed spread spectrum systems, the direction of movement in the circular buffer can change. Similarly, in phase locked loop situations, the direction of the offset can change. The present invention can be adapted to handle such situations. One possible adaptation would be to provide a further adder which adds the contents of the B register and the L register to derive the highest numbered address in the buffer and a further multiplexer responsive to the sign bits of M for selecting either the output of the B register (defined herein as the lowest address in the buffer) or the output of the additional adders as an input to the comparator 30. The adder/subtracter is also responsive to the sign bit of the register for subtracting L from I+M, when the sign bit of M is positive or adding L to the I+M value, when the sign bit is negative. The comparator also is responsive to the sign bit. In the case where M is positive, if the comparator determines that its A input, I+M−L, is greater than or equal to its B input, the base address, B, then it instructs the multiplexer 32 to select its A input, I+M−L. However, if M is negative, the comparator output must be modified such that when the A input of the comparator, I+M+L, is less than or equal to the B input of the comparator, B+L, then the multiplexer must be instructed to select its A input, I+M, and its B input, I+M+L otherwise.

Figure 3:
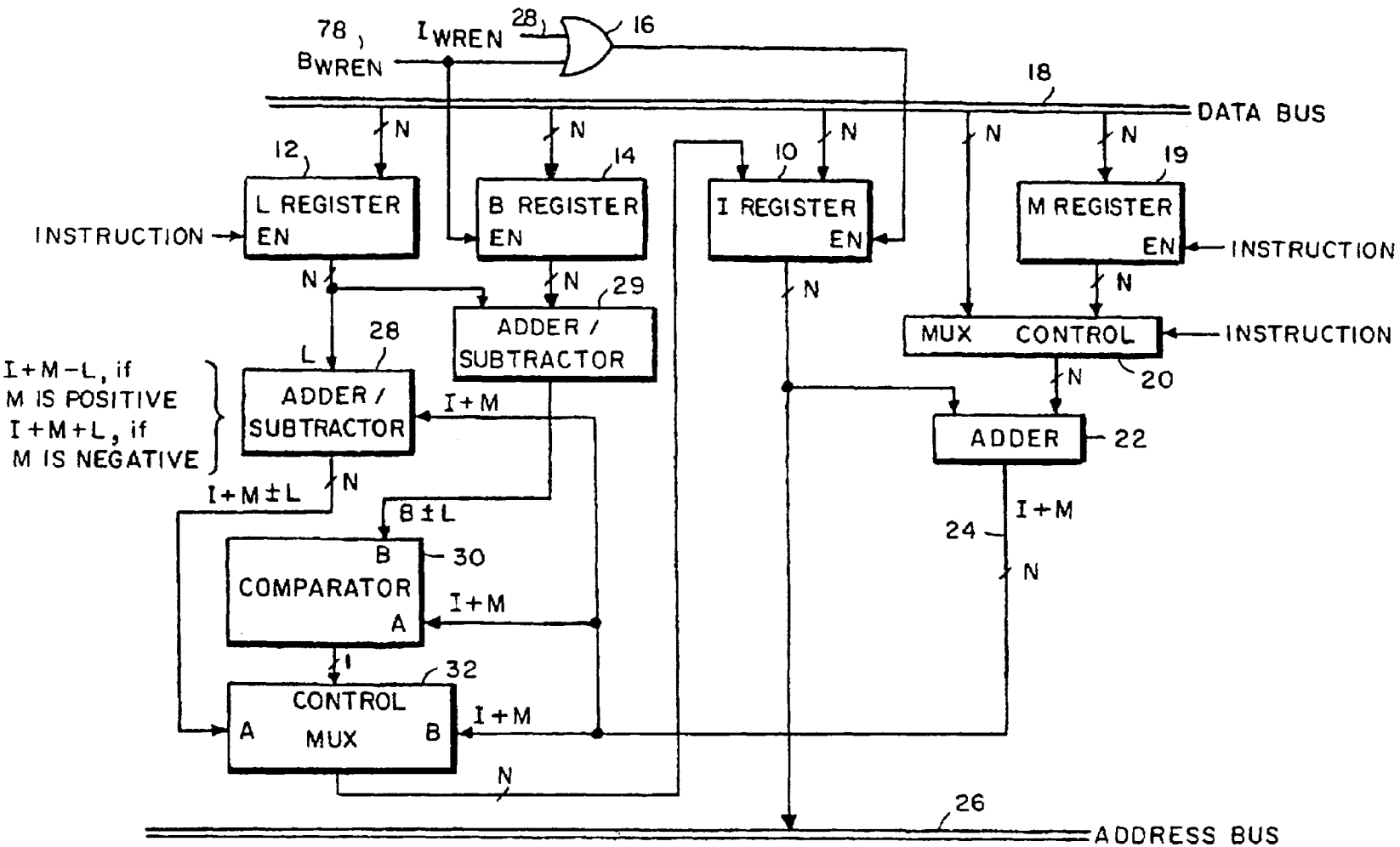
FIG. 3 shows a second embodiment of the address generator of the present invention.

The speed of the calculation of the address can be further increased with a slight modification to the circuitry shown in FIG. 2. As shown in FIG. 2, valid data does not appear at the output of adder/subtractor 27 until it receives the value of I+M from adder 22. In other words, to obtain I+M±L for comparison with B, the comparator 30 must wait through the propagation delay of adder 22 plus the propagation delay of adder/subtractor 27. The circuitry in FIG. 2 can be modified as shown in FIG. 3, to avoid the need for the comparator to wait through this double propagation delay by providing another register and a different adder/subtracter 29 which has at its inputs the outputs of the B and L registers and calculates B±L. Then comparator 30 can compare I+M with B±L rather than comparing I+M±L with B. The former comparison is essentially the same as the latter, the value L simply being moved to the other side of the equation. In this embodiment the propagation delay through to the apparatus is reduced because the calculation of B±L occurs simultaneously with the calculation of I+M rather than sequentially afterwards. Of course, one could easily avoid the need for a second adder/subtracter by utilizing only one adder/subtracter and storing in a register the results of one of the addition/subtraction operations.

Figure 4:
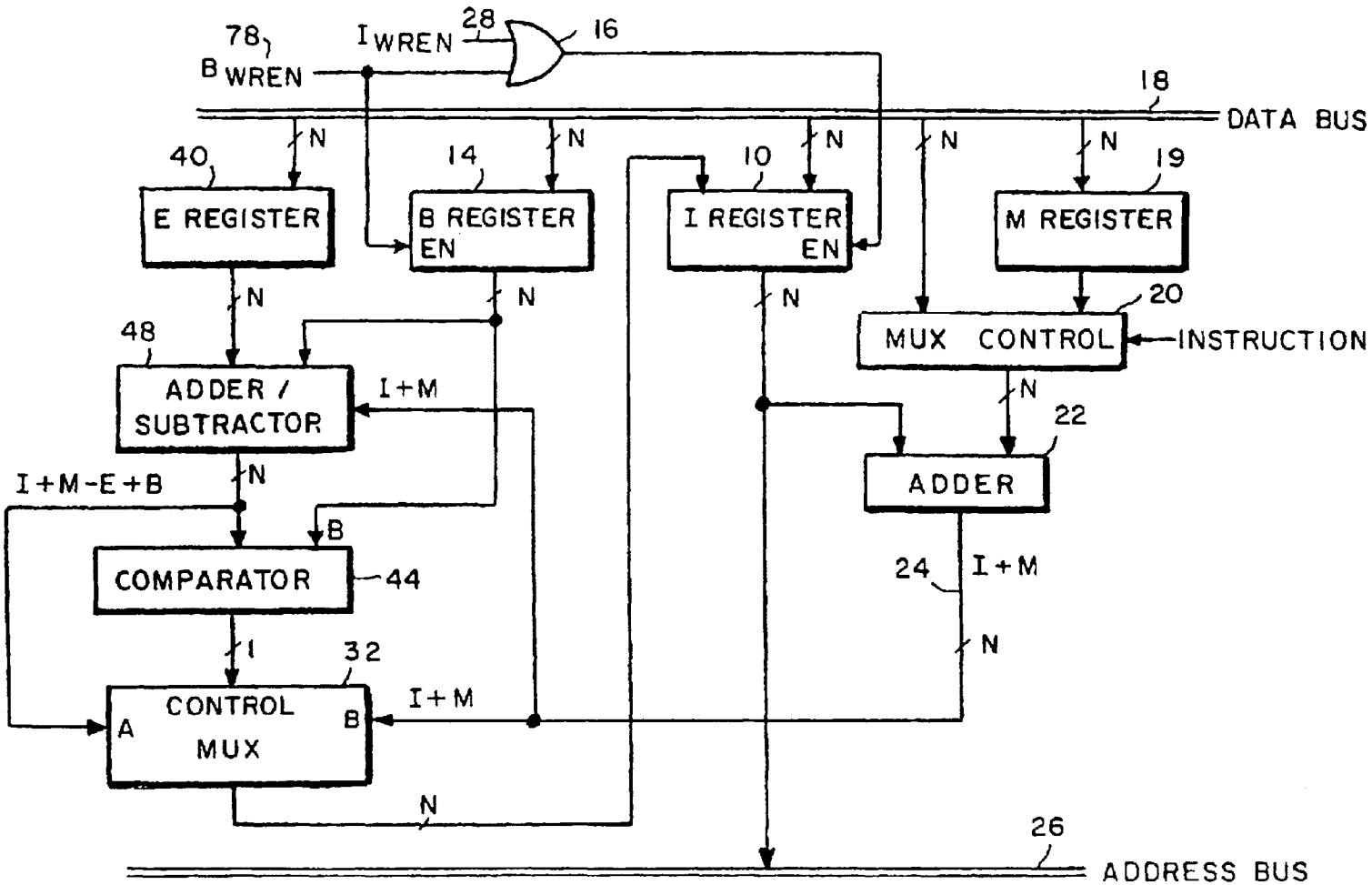
FIG. 4 shows a third embodiment of the address generator of the present invention.
Figure 5:
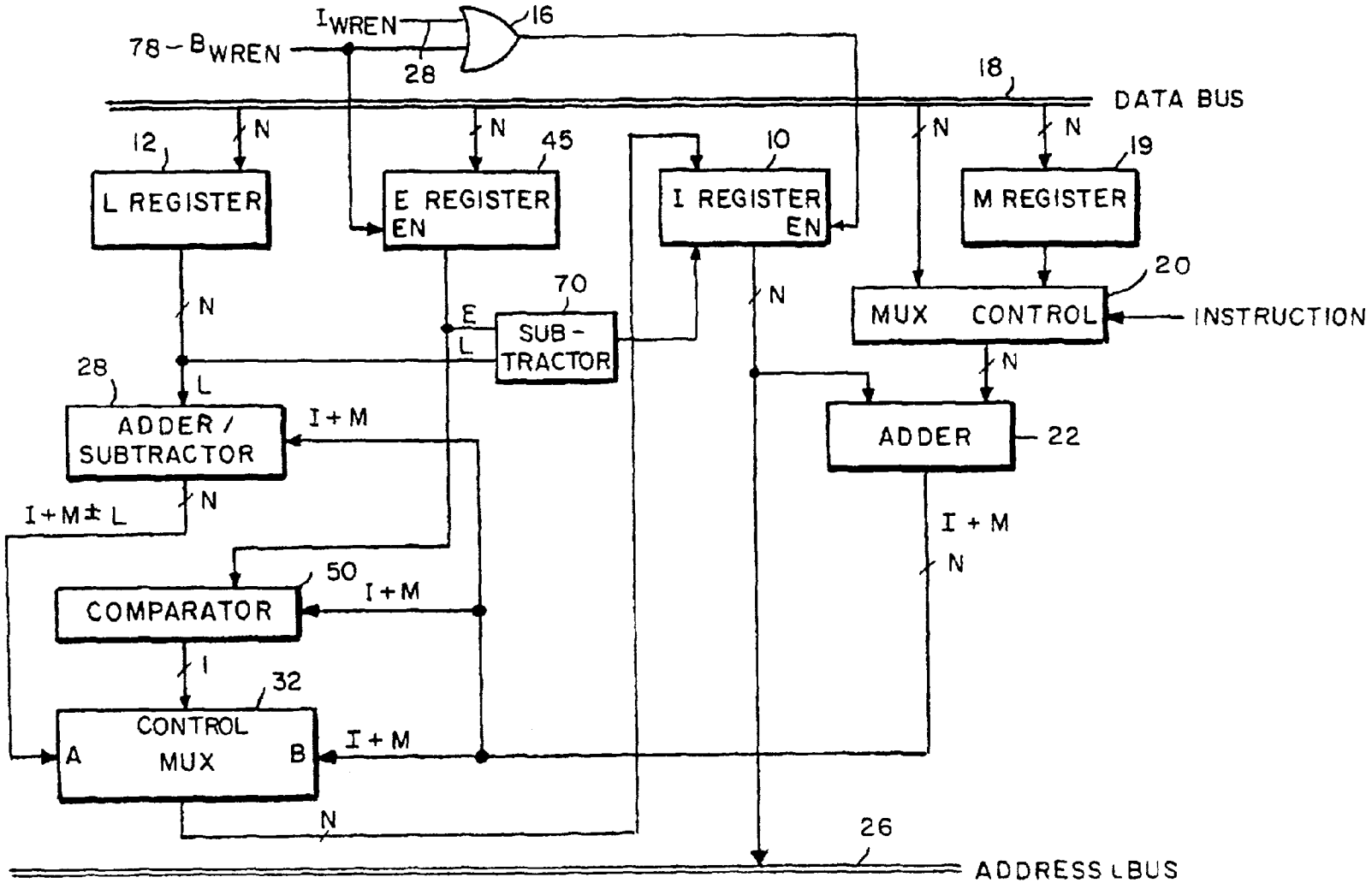
FIG. 5 shows a fourth embodiment of the address generator of the present invention.

Additional alternate embodiments of the invention are shown in FIGS. 4 and 5. In order to define the circular buffer, one must know 1) its base address and its length (as is provided in the FIG. 2 embodiment described above, 2) its end address and its length, or 3) its base address and end address. FIGS. 2 and 3 illustrate embodiments utilizing registers containing the base address and length information noted in the first alternative. FIGS. 4 and 5 illustrate alternate embodiments of the invention which utilize registers containing the information noted in the second and third alternatives.

In the FIG. 4 embodiment, the L register is replaced by an E register 40 containing the end address of the buffer. Much of the logic of this embodiment is similar to the embodiment of FIG. 2; therefore, similar numbers are used for similar components. Adder/subtractor 28 and comparator 30 are replaced by adder/subtractor 42 and comparator respectively. In this embodiment, adder/subtractor 42 requires inputs from the E register, B register and adder 22. Adder/subtractor 42 calculates I+M−E+B, regardless of the sign of M (assuming that the B register is initialized with the lowest address in the buffer when M is positive, and with the highest address when M is negative).

When M is positive, comparator 44 compares I+M−B+E to B. If I+M−E+B is less than or equal to B, then comparator 44 controls multiplexer 32 to select its A input, having the value I+M−E+B. Otherwise, multiplexer 32 is controlled by comparator 44 to select its B input, having the value I+M. When M is negative, the adder/subtractor 42 still calculates I+M−E+B and the comparator still compares I+M−E+B with the contents of the B register, but now must determine if I+M−E+B is less than or equal to B. If so, comparator 44 instructs multiplexer 32 to select its A input, the value I+M−E+B. Otherwise, multiplexer 32 is controlled by comparator 44 to select its B input, the value I+M. Minor modifications are necessary if M may be either positive or negative during operation.

FIG. 5 shows another embodiment utilizing an L register 12, E register 45, I register 16 and M register 19. The FIG. 5 embodiment is substantially similar to the embodiments shown in FIG. 2, except that comparator 30 is replaced by comparator 50. Adder/subtractor 28 remains the same as in FIG. 2 and calculates I+M−L, if M is positive, or I+M+L, if M is negative, just as in the FIG. 2 embodiment. Comparator 50 compares the value of I+M output from adder 22, with the contents of the E register. When M is positive, If I+M is less than or equal to E (which is the highest address, when M is positive), the comparator controls multiplexer 32 to select its B input, I+M. Otherwise, the multiplexer selects its A input, I+M−L. When M is negative, the comparator 50 determines if I+M is greater than or equal to the end address E (which is the lowest numbered address, when M is negative) and, if so, controls multiplexer 32 to select its B input, I+M. Otherwise, it selects its A input, I+M+L.

In the embodiment of FIG. 5, additional circuitry is necessary to automatically load the I register with the base address at initialization, compared with the previously discussed embodiments since, in this embodiment, there is no base register. Accordingly, the base address is derived from the contents loaded into the L and E registers and automatically loaded into the I register. Subtracter 70 receives at its inputs the output of the L register 12 and the E register 45, subtracts L from E, and outputs that value to the input of the I register during the initial register loading process only. Since, in the embodiment shown in FIGS. 4 and 5, the I register is enabled by the $E_{WREN}$ signal 78, the L register must be loaded before the E register in order for the subtracter to place the correct value in the I register. Alternate embodiments are possible. For example, as with FIG. 3 it is possible to use adder/subtractor 28 to replace the additional subtracter 70, by switching adder/subtractor 28 to calculate and load the I register with the base value at the time of register initialization.

The embodiment of FIG. 4 can also be modified for situations in which M may alternate between a positive and negative value.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An apparatus for generating target addresses within a circular buffer extending in a memory between bounds defined by a base address and an end address, the base address being any predetermined location in the memory, responsive to the next previous address, *I*, accessed within said *circular* buffer[, I,] and a specified offset, M, comprising:

a first register for storing the previous address accessed within said buffer, I;

a second register means for storing information which defines the position and size of said circular buffer in memory, *said second register means comprising an L register for storing the length of the circular buffer, L, and a B register for storing the base address of the circular buffer, B*;

*a third register for storing a specific offset value, M* a first logic circuit for generating an absolute address by calculating the value of I+M, *wherein M is positive and said first logic circuit comprises an adder having a first input connected to accept the output of said first register, a second input connected to accept the output of said third register and an output which provides the sum of the values applied to first and second inputs*;

a second logic circuit for generating a wrapped address by modifying the value I+M by the length of the buffer, *said second logic circuit comprising a subtracter having a first input coupled to the output of said L register, a second input coupled to the output of said adder and an output which is the difference between the inputs, I+M−L*;

a comparator for comparing one of the absolute address and wrapped address with a boundary of said circular buffer to determine whether one of said absolute address and said wrapped address is between the bounds of the circular buffer, *said comparator having a first input coupled to the output of said subtracter, I+M−L, a second input coupled to the output of said B register, B, and an output which in a first state when said first input is greater than or equal to said second input and in a second state otherwise*; and means for loading said first register with the one of the absolute address and the wrapped address which is within the bounds of the circular buffer, *said means for loading comprising a multiplexer having a first input coupled to the output of said adder, I+M, a second input coupled to the output of said subtractor, I+M−L, and a third input coupled to the output of said comparator and having an output coupled to the input of said I register, said output being the value at said first input responsive to said comparator output being in said second state and being the value at said second input responsive to said comparator output being in said first state*.

2. The apparatus as set forth in claim [1] *18* further comprising a third register for storing a standard offset value.

3. The apparatus as set forth in claim [2] *18 further comprising an M register for storing M and* wherein said first logic [means] *circuit* comprises an adder having a first input connected to accept the output of said [I] *first* register, a second input connected to accept the output of said M register and an output which provides the sum of the values applied to first and second inputs.

4. The apparatus as set forth in claim 3 wherein M is positive and said second register [means] comprises an L register for storing the length of the circular buffer, L, and a B register for storing the base of the circular buffer, B.

5. The apparatus as set forth in claim 4 wherein, said second logic circuit comprises a subtracter having a first input coupled to the output of said L register, a second input coupled to the output of said adder and an output which is the difference between the inputs, I+M−L, said comparator has a first input coupled to the output of said subtracter, I+M−L, a second input coupled to the output of said B register, B, and an output which is in a first state when said first input is greater than or equal to said second input and in a second state otherwise, and said [means for loading comprises a] multiplexer [having] *has* a first input coupled to the output of said adder, I+M, a second input coupled to the output of said subtractor, I+M−L, and a third input coupled to the output of said comparator and having an output coupled to the input of said I register, said output *of said multiplexer* being the value at said first input responsive to said comparator output being in said second state and being the value [of] *at* said second input responsive to said comparator output being in said first state.

6. The apparatus as set forth in claim 3 wherein M is negative and said second register [means] comprises an L register for storing the length of the circular buffer, L, and a B register for storing the lowest address in the circular buffer, B.

7. The apparatus as set forth in claim 6 wherein;

said second logic [means] *circuit* comprises a second adder having a first input coupled to the output of said L register, a second input coupled to the output of said adder and an output which is the sum of its inputs, I+M+L, said comparator [means] has a first input coupled to the output of said second adder, I+M+L, a second input coupled to the output of said B register, B, and an output which is in a first state when said first input is less than or equal to said second input and in a second state otherwise, and said [means for loading comprises a] multiplexer [having] *has* a first input coupled to the output of said first adder, I+M, a second input coupled to the output of said second adder, I+M+L, and a third input coupled to the output of said comparator, and having an output coupled to the input of said I register, said output *of said multiplexer* being the value at said first input responsive to said comparator output being in said second state and being output being the value *at* said second input responsive to said comparator output being in said first state.

[8. The apparatus as set forth in claim 3 wherein M is positive and said second register comprise an E register for storing the highest address in the circular buffer and an L register for storing the length of the circular buffer.]

[9. The apparatus as set forth in claim 8 wherein, said second logic means comprises subtracter means having a first input coupled to the output of said L register, a second input coupled to the output of said adder and an output which is the difference between the inputs, I+M−L, said comparator has a first input for coupled to the output of said adder means, I+M, a second input coupled to the output of said E register, E, and an output which is in a first state when said first input is less than or equal to said second input and in a second state otherwise, and said means for loading comprises a multiplexer having a first input coupled to the output of said subtracter, I+M−L, a second input coupled to the output of said adder, I+M, and a third input coupled to the output of said comparator, and having an output coupled to the input of said I register, said output being the value at said first input responsive to said comparator output being in said second state and said output being the value at said second input responsive to said comparator output being in said first state.]

[10. The apparatus as set forth in claim 3 wherein M is negative and said second register comprise an E register for storing the highest address in the circular buffer and an L register for storing the length of the circular buffer.]

[11. The apparatus as set forth in claim 10 wherein, said second logic circuit comprises a second adder having a first input coupled to the output of said register, a second input coupled to the output of said adder and an output which is the sum of the inputs, I+M+L, said comparator has a first input coupled to the output of said first adder, I+M, a second input coupled to the output of said E register, and an output which is in a first state when said first input is greater than or equal to said second input and in a second state otherwise, and said means for loading comprises a multiplexer having a first input coupled to the output of said first adder, I+M, a second input coupled to the output of said second adder, I+M+L, and a third input coupled to the output of said comparator, and having an output coupled to the input of said I register, said output being the value at said second input responsive to said comparator output being in said second state and said output being the value at said first input responsive to said comparator output being in said first state.]

12. The apparatus as set forth in claim 3 wherein M is positive and said second register [means] comprise an E register for storing the highest address in the circular buffer and a B register for storing the lowest address in the circular buffer.

13. The apparatus as set forth in claim 12 wherein, said second logic [means] *circuit* comprises *an* adder/subtracter [means] having a first input coupled to the output of said E register, E, a second input coupled to the output of said B register, B, a third input coupled to the output of said adder, I+M, and an output which is the value I+M−E+B, said comparator has a first input coupled to the output of said adder/subtracter [means], I+M−E+B, a second input coupled to the output of said B register, B, and an output which is in a first state when said first input is greater than or equal to said second input and in a second state otherwise, and said [means for loading comprises a] multiplexer [having] *has* a first input coupled to the output of said adder, I+M, a second input coupled to the output of said adder/subtracter, I+M−E+B, and a third input coupled to the output of said comparator and having an output coupled to the input of said I register, said output *of said multiplexer* being the value at said first input responsive to said comparator output being in said second state and said output being the value [of] *at* said second input responsive to said comparator output being in said first state.

14. The apparatus as set forth in claim 3 wherein M is negative and said second register comprise*s* an E register for storing the lowest address in the circular buffer and a B register for storing the highest address in the circular buffer.

15. The apparatus as set forth in claim 14 wherein, said second logic [means] *circuit* comprises *an* adder/subtracter [means] having a first input coupled to the output of said E register, E, a second input coupled to the output of said B register, B, a third input coupled to the output of said adder, I+M, and an output which is the value I+M−E+B, said comparator has a first input coupled to the output of said adder/subtracter [means], I+M−E+B, a second input coupled to the output of said B register, B, and an output which is in a first state when said first input is less than or equal to said second input and in a second state otherwise, and said [means for loading comprises a] multiplexer [having] *has* a first input coupled to the output of said adder, I+M, a second input coupled to the output of said adder/subtractor, I+M−E+B, and a third input coupled to the output of said comparator and having an output coupled to the input of said I register, said output *of said multiplexer* being the value at said first input responsive to said comparator output being in said second state and said output being the value [of] *at* said second input responsive to said comparator output being in said first state.

16. The apparatus as set forth in claim [3] *4* further comprising;

means for initializing the contents of the M, B and L registers, and means for automatically loading the [I] *first* register with the contents of the B register.

17. The apparatus as set forth in claim 3 further comprising, means for initializing the *second* register [means], and means for automatically loading the I register with the base address of the circular buffer responsive to initialization of said *second* register [means].

*18. An apparatus for generating target addresses within a circular buffer extending in a memory between bounds defined by a base address and an end address, the base address being any predetermined location in the memory, responsive to the next previous address I accessed within said buffer and a specified offset, M, said apparatus comprising:*

*a first register for storing the previous address, I, accessed within the circular buffer; a second register for storing information which defines the position and size of the circular buffer in memory;*

*a first logic circuit for generating an absolute address by calculating the value of I+M*

*a second logic circuit for generating a wrapped address by modifying the value I+M by the length of the circular buffer;*

*a comparator for comparing the wrapped address with a boundary of the circular buffer to determine which one of said absolute address and said wrapped address is between the bounds of the circular buffer; and*

*a multiplexer for loading said first register with the one of the absolute address and the wrapped address which is within the bounds of the circular buffer.*

* * * * *